Aug. 30, 1949.   F. R. GREYSON   2,480,727
METHOD FOR COOLING

Original Filed Jan. 22, 1944   2 Sheets-Sheet 1

INVENTOR
FREDERICK R. GREYSON
BY

INVENTOR
FREDERICK R. GREYSON
BY
Brown Jackson Boettche & Dienner

Patented Aug. 30, 1949

2,480,727

UNITED STATES PATENT OFFICE 2,480,727

METHOD FOR COOLING

Frederick R. Greyson, Oakland, Calif., assignor to Kaiser Company, Inc., Oakland, Calif., a corporation of Nevada Original application January 22, 1944, Serial No. 519,322. Divided and this application August 29, 1945, Serial No. 613,368

12 Claims. (Cl. 62—170)

This application is a division of my co-pending application Serial Number 519,322, filed January 22, 1944, for Rotary cooling bin.

This invention relates to a method of cooling heated material and an apparatus for carrying out the same.

There are many materials which are subjected to comparatively high temperatures in the course of treatment thereof and are discharged from the treating apparatus at high temperatures which present serious problems in the handling of such materials, particularly where they are to be transported by conveyors or discharged into bins or into railway cars. Examples of such materials are coke, cement clinker, burnt lime, and the sinter discharged from sintering machines. I shall describe my invention more particularly as used for cooling sinter discharged from a sintering machine, it being understood that within the broader aspects of my invention it may be used for cooling numerous other materials, some of which have been referred to above. In carrying out my invention I provide a rotating bin structure disposed to receive the hot sinter as it is discharged from the sintering machine, means being provded for removing from the bin structure the cooled sinter and discharging it onto a conveyor which may transport the sinter to a bin, a storage pile, a car, or to any other suitable location. It is sometimes desirable in handling sinter to assist in the cooling by the application of a waterspray and I provide means for carrying off the water. I also provide means for delivering blocks of sinter to the cooling bin. I also provide means, in the nature of a retaining wall, whereby the blocks or slabs of sinter may be piled one upon the other, the means for removing the cooled blocks being so disposed as to remove the bottom blocks only, thus permitting of the blocks travelling with the bin throughout several rotations thereof so as to be effectively cooled before being discharged from the bin. Further objects and advantages of my invention will appear from the detail description.

Figure 3:
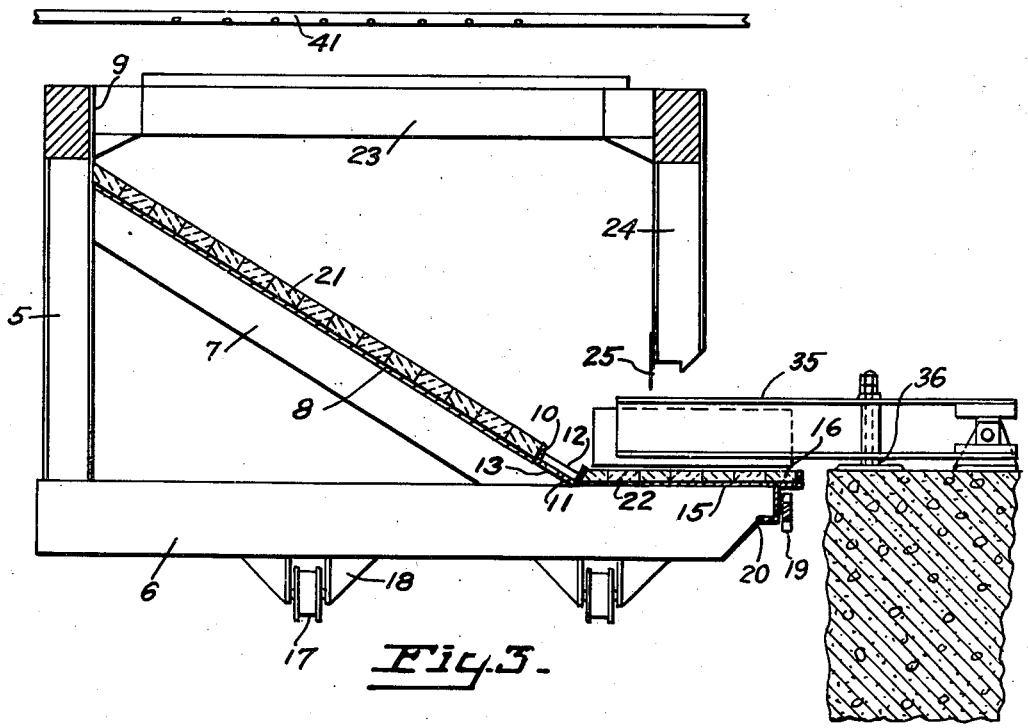
Figure 3 is a view partly in section, on an enlarged scale, taken substantially on line 3—3 of Figure 1 with many parts behind the section plane being omitted for the sake of clarity.

The cooling bin is provided with a structural steel frame comprising inner upright I beams 5, horizontal floor beams 6, and beams 7 secured to the beams 5 and 6 and inclined downward and outward of the bin. A deck 8 of plate steel is secured upon the upper faces of the inclined deck beams 7, and extends downward therealong from an inner retaining wall 9, also of steel plate, secured to the upper portions of the uprights 5. An angle strip 10 is secured on the upper faces of deck beams 7 at the lower edge of deck 8, in spaced relation to a circular angle strip 11 secured to beams 7 at the lower outer ends thereof. The angle strips 10 and 11 define between them a channel which receives cast iron grate bars 12 seating at their end portions on the strips 10 and 11, there being a space 13 between these strips, as shown more clearly in Figure 3. The portions of the floor beams 6 projecting outwardly beyond deck beams 7 are covered by plate steel 15, to the outer portion of which is secured an angle retaining strip 16. Suitably spaced flanged supporting wheels 17 are mounted in brackets 18 secured to certain of the floor beams 6, and a gear rack 19 is bolted or otherwise suitably secured to a frame member 20 of Z cross section secured to the outer ends of the floor beams 6. The frame includes various other bracing and connecting members, which need not be referred to in detail, the elements of this frame preferably being secured together by welding, though any other suitable securing means may be employed.

Figure 4:
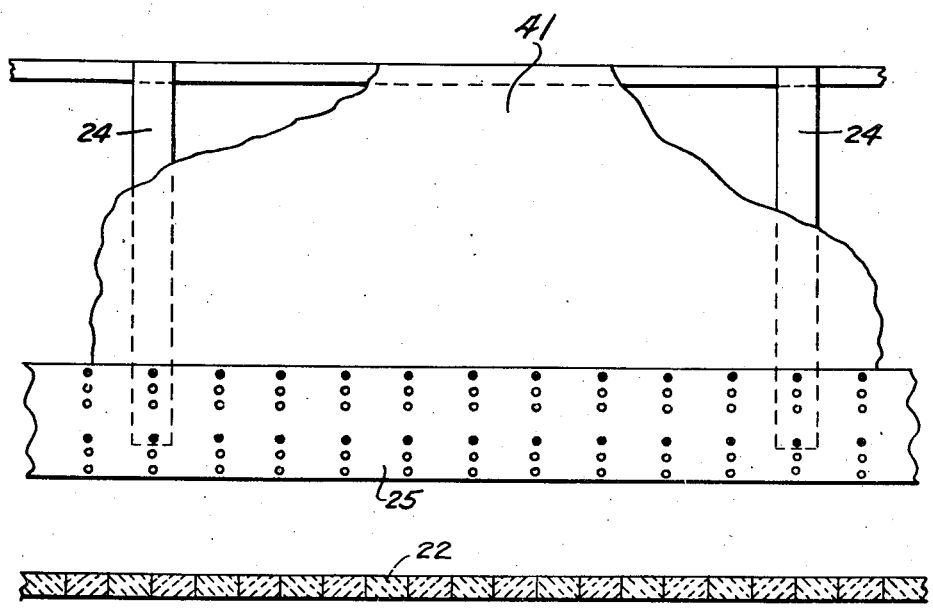
Figure 4 is a fragmentary detail view, on an enlarged scale, of the material retaining plate and the supporting means therefor, taken along lines 4—4 of Fig. 1.

The deck 8 is provided with a refractory covering 21, conveniently formed of fire bricks, laid thereon in a suitable manner, extending from the upper inner retaining wall 9 to the angle strip 10. Likewise, the deck 15 is provided with a refractory covering formed of fire bricks 22 laid thereon and extending from the angle strip 11 to the retaining angle strip 16. A plurality of upper horizontal arms 23 extend outwardly from the uprights 5, at the upper ends thereof, to which they are welded or otherwise suitably secured. Vertical arms 24 are secured to the outer ends of arms 23 and extend therefrom downward to within a short distance of the outer horizontal shelf portion of the bin, comprising the deck 15 and the refractory fire brick covering therefor. Plates 41 shown in Fig. 4 are advantageously employed to cooperate in providing an outer wall for the rotating bin structure. A retaining plate 25, preferably formed of high carbon plate steel of suitable thickness, is mounted on the lower portion of the vertical arms 24, by means of bolts passing through openings in the plate and through the inner flanges of the arms 24, the latter being of I beam construction. As is shown more clearly in Figure 4, the retaining plate 25 is provided with a series of vertically spaced openings for each of the bolts, providing means whereby this retaining plate may be adjusted vertically to suit requirements. Conveniently, plate 25 may be formed in a plurality of sections, capable of separate adjustment, to facilitate adjustment of the plate as a whole.

Figure 1:
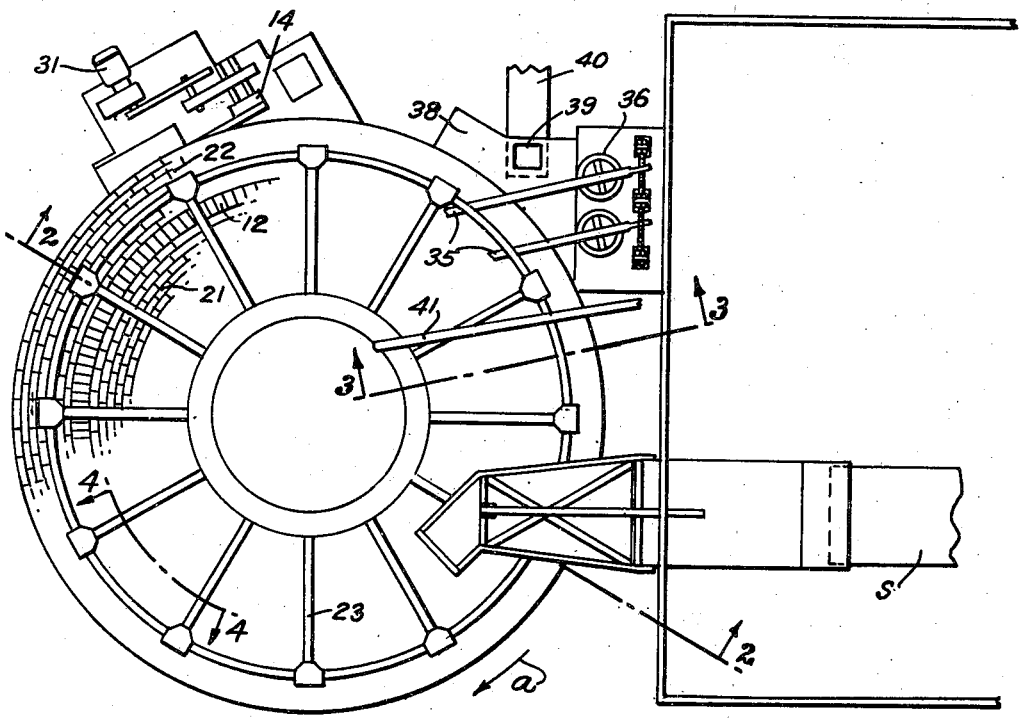
Figure 1 is a semi-diagrammatic plan view of a cooling bin embodying my invention, and associated parts.
Figure 2:
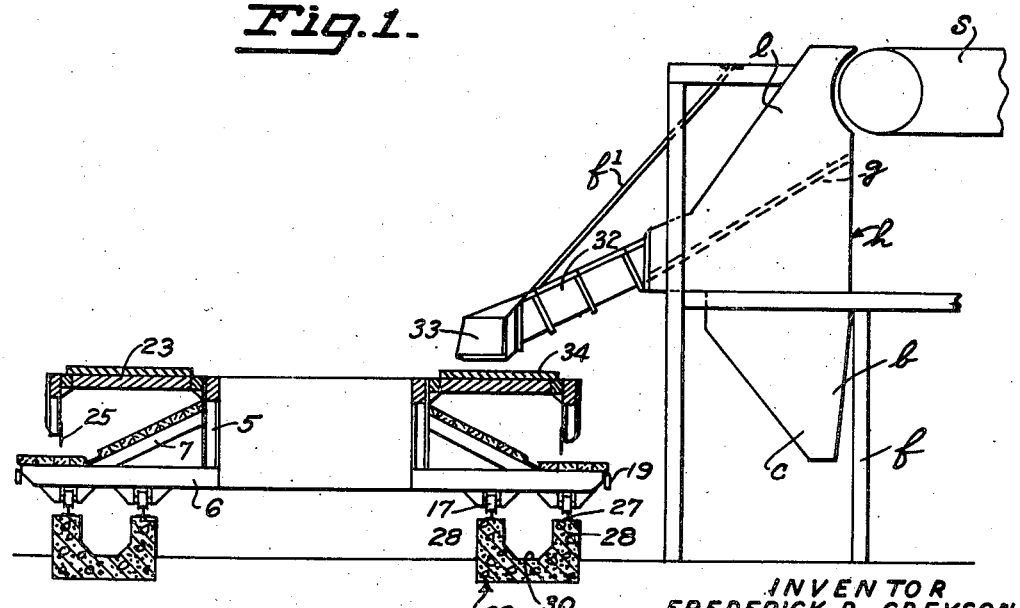
Figure 2 is a view partly diagrammatic and partly in section taken substantially on line 2—2 of Figure 1 with many parts behind the section plane being omitted for the sake of clarity.

Referring to Figures 1 and 2, the wheels 17 travel upon the spaced rails of the track 27 mounted upon uprights 28 of a suitable foundation 29 defining an inner trough 30. The bin structure is driven in any suitable manner, conveniently by means of an electric motor 31 having driving connection, through a gear reduction unit 14 of suitable type to the gear rack 19, the bin being rotated in a clockwise direction as indicated by the arrow $a$ in Figure 1.

From what has been said it will be seen that the bin comprises a main inner portion of frusto-conical shape and a relatively narrow horizontal outer shelf portion, with a grating therebetween, the retaining plate or wall 25 overlying the horizontal shelf and serving to restrain the material against outward movement therealong as will be explained more fully presently. I have illustrated the cooling bin of my invention as used for cooling sinter discharged from a sintering machine $s$ shown diagrammatically in Figures 1 and 2. This machine may be a continuous machine of the Dwight & Lloyd type, well known in the sintering art, comprising an endless track along which travel a train of pallets, this track having a return bend at the discharge end and a return bend at the feed end. The mixture to be sintered, which may include flue dust, metal ores, and various other substances, as is well known in the art, is deposited in a thick layer or bed in the pallets where it is ignited and sintered by downward combustion, the sinter being discharged from the pallets as the latter pass around the return bend at the discharge end of the machine. The sinter is thus broken off and discharged in large blocks or slabs. The machine $s$ is provided, at its discharge end, with a hood $h$ comprising a fines bin $b$ shaped at its lower portion to provide a discharge chute $c$ the outlet of which, in practice, is provided with a suitable gate or valve. A grate or grizzly, as it is termed in the sintering art, $g$, extends across the upper end of bin $b$, between the latter and a sinter discharge chute $l$. The sintering machine $s$ is provided with a suitable frame $f$, and a chute 32, conveniently supported by an extension $f^1$ of frame $f$, extends downward from chute $l$ over the conical portion of the bin, above the arms 23, this chute 32 being curved in plan and directed generally in the direction of rotation of the bin, as shown more clearly in Figure 1. The curved construction of the chute decreases the speed of delivery and the tumbling effect of a sinter block and aids in preventing breakage thereof, or the production of fines therefrom. At its lower end, chute 32 is provided with an outwardly swinging gate 33 and, at its upper end, this chute is disposed to receive the sinter blocks discharged from chute $l$. Preferably, each of the arms 23 is provided, at the upper face thereof, with a wear strip 34, which may be formed of cast iron or other suitable material, to take wear incident to movement of sinter thereover, that being desirable since the sinter in many cases is highly abrasive in character. The sinter discharged from chute 32 is deposited upon the inclined surface of the conical portion of the bin and slides downward therealong, that is, in a continuous conical-helical path with respect to the vertical axis of the bin across the space above the grating and thence onto the outer horizontal shelf portion of the bin. The retaining plate or wall 25 is so adjusted that a block of sinter resting upon the outer horizontal shelf portion may move outward therealong, but an upper block resting upon a block resting on the shelf is restrained against outward movement by the wall 25. In the rotation of the bin, the sinter thereon is air cooled, and the lower blocks, resting upon the horizontal shelf, are then removed therefrom by scrapers 35 pivoted on posts 36 disposed to one side of the bin, these scrapers being adjusted and held in adjustment by associated screw adjusting means of suitable known type. The scrapers 35 are disposed a short distance above the upper face of the shelf portion of the bin, so as to remove therefrom the lower blocks of sinter resting thereon, the sinter blocks thus removed being deflected by the scraper into a hopper 38 extending beneath the cooling bin and provided with an outlet opening 39 overlying a belt conveyor 40 of suitable type. By the time the sinter blocks are removed from the bin, they have been sufficiently cooled so as to avoid danger of injury to the conveyor 40, and may then safely be handled thereby so as to be transported to a desired point for further treatment or for storage. By providing the retaining wall 25 and properly adjusting the same, several layers of sinter blocks may be supported upon the horizontal shelf portion of the bin, i. e. in a tier-like arrangement, so that each block may make two or more rotations with the bin before being removed therefrom, assuring adequate cooling of the sinter blocks before discharge thereof into the hopper 38. If desired, a suitable number of spray pipes 41, one of which is shown, may be disposed above the main or conical portion of the bin, for spraying cooling water upon the sinter or other hot material thereon, to assist in the cooling operation, though that may not be necessary in many cases. It has been found advantageous in the cooling of sinter block to have one waterspray located just ahead of the delivery chute so that the block is deposited on the bin and makes substantially one complete rotation before coming into contact with the water-spray. In this manner the block is partially cooled in air before water is applied, which results in less formation of steam pockets or the like, thereby subjecting the block to fewer shocks which would tend to crack and shatter it with the production of an appreciable amount of fines or small particles.

When cooling water is applied to the material, such as sinter blocks, as by means of a spray device extending over the cooling bin, the water runs down over the material lying on the inclined inner portion of the cooling bin, and falls between the grating bars 12 into trough 30 of foundation 29. Any undesirably small pieces which may be present at this stage will also fall through the grating and into the trough. The water, with any other material which may have fallen through the grating, is removed from the trough in any suitable manner. When it is desired to use the cooling bin for cooling materials other than sinter, such as materials in relatively small pieces or particles which would pass in objectionable amount through the grating, the space above the grating may be closed by suitable plates laid thereon between the angle strips 10 and 11, or in any other suitable manner. In that event, the particles of the materials do not pass through the grating, and the material under treatment flows downward along the conical portion of the bin and thence outward onto the horizontal shelf portion thereof. The scrapers 35 are then suitably adjusted for removing the cooled material from the horizontal portion of the bin and deflecting it to the hoppers 38, and the retaining wall 25 is adjsted to suit the character of the material being cooled. In the case of material in small pieces or of granular material, retaining wall 25 is so adjusted that the angle of inclination of the outer side of the pile of material on the horizontal shelf portion is within the angle of repose of that material, avoiding flow of the material outward beyond the circumferential edge of the bin, such as would cause spillage and waste of the material. In the broader aspects of my invention, the chute 32 may be adjustable and may be considered as means for delivering to a cooling zone, preferably of annular form, blocks of sinter from the sintering machine s, or any other heated material, in block form or in the form of small pieces or granules, which it is desired to cool. Whether the material be in block form or in granular form, the structure illustrated and described herein constitutes, in effect, a revolving bin which receives the material being cooled and restrains it against outward movement, cooling of the material in this bin proceeding sufficiently to permit of the material being handled to advantage by a belt conveyor or other means when it is discharged from the bin. It will be understood, of course, that the diameter of the bin, its speed of rotation, and related features may be regulated to suit requirements in accordance with the particular material to be cooled.

It is an important advantage of this invention that material such as sinter blocks can be handled during cooling with a minimum amount of breakage and with very little, or no production of fines. It is another advantage that heated material can be sufficiently cooled before going to a conveyor belt that the latter does not undergo excessive wear, or destruction, by contact with the heated product.

As above indicated, and as will be understood by those skilled in this art, changes in construction and arrangement of parts of my invention may be resorted to without departing from the field and scope thereof, and I intend to include all such variations, as fall within the scope of the appended claims, in this application in which the preferred form only of my invention has been disclosed.

I claim:

1. A method of continuously cooling granular material which comprises depositing said material to be cooled into a rotating cooling zone for radially outward and downward flow in a conical-helical path across a sloping heat-resistant surface in such a manner that a deposit will build up thereon, continuing such flow in heat exchange relationship with a cool atmosphere for a sufficient time to produce a substantial cooling of said material, transferring said partially cooled material to a horizontal cooling zone for the further cooling thereof, restraining the outward flow of said material across a rotating horizontal cooling zone, and removing said further cooled material from said horizontal cooling zone.

2. A method of continuously cooling granular material which comprises depositing said material to be cooled into a rotating cooling zone for radially downward flow in a conical-helical path across an inclined abrasive resistant surface and for radially outward flow across a horizontal abrasive-resistant surface, continuing such flow in heat exchange relationship with a cool atmosphere for a sufficient time to produce a substantial cooling of said material, restraining the radially outward flow of said cooled material over said horizontal surface to form a layer of said material of substantially uniform thickness thereon, and continuously removing said layer from said horizontal surface.

3. In a method of continuously cooling shaped solid objects which are of a fragile character such that tumbling action results in substantial breakage of said objects, and which are heated to a temperature such that contact of the solid objects with a conveyor belt would result in damage thereto, the steps which comprise causing a downward and radially outward but non-tumbling flow of said objects in a conical-helical path across a rotating heat-resistant surface and in heat exchange relationship with a cool atmosphere adapted to lower the temperature of said objects, continuing such flow for a time sufficient to effect a substantial cooling of said objects, and removing the cooled objects at a level below the level where the objects come into initial contact with the heat-resistant surface.

4. In a method of continuously cooling shaped solid objects which are of a fragile character such that tumbling action results in a substantial breakage thereof, and which are supplied at a temperature sufficiently high to damage a conveyor belt upon initial contact therewith, the steps which comprise causing a downward and radially outward but non-tumbling flow of said objects through a continuous sloping and rotating zone surrounded by a cool atmosphere thereby defining a conical-helical path, continuing such flow for a time sufficient to lower the temperature of said objects, removing to a horizontal heat-resistant surface the thus partially cooled objects from said angular surface without tumbling said objects, causing a rotational movement of said partially cooled objects on said horizontal surface in communication with a cool atmosphere adapted to further cool said objects, and removing the thus further cooled objects from said horizontal heat-resistant surface.

5. A method of continuously cooling and conveying shaped solid objects which are of a fragile character such that tumbling action results in substantial breakage thereof, and which are supplied to the cooling and conveying equipment at an initial temperature sufficiently high to damage non-heat resistant conveying equipment, which comprises causing a downward and radially outward but non-tumbling flow of said objects in a conical-helical path within a rotating inner cooling zone and in contact with a cool atmosphere, causing a lateral and radially outward but non-tumbling flow of said objects along a rotating outer zone and in contact with a cool atmosphere for further reducing the temperature of said objects, and continuously removing said objects from said outer zone and depositing them onto said non-heat resistant conveying equipment at a temperature sufficiently low to prevent damage thereto.

6. A method of cooling and conveying sinter blocks or like objects of fragile character which are continuously received at a temperature sufficiently high to damage non-heat resistant conveying equipment, which comprises depositing said blocks into an inner cooling zone for downward and radially outward but non-tumbling flow of said blocks in a conical-helical path across a rotating abrasive-resistant surface, angularly and outwardly displacing said blocks during said flow while in heat-exchange relationship with a cool atmosphere adapted to lower the temperature thereof, applying a liquid spray to said angularly and outwardly displaced blocks to further reduce the temperature thereof, transferring said blocks to another cooling zone rotating with said inner cooling zone for radially outward but non-tumbling lateral flow across a horizontal abrasive-resistant surface, and continuously removing said blocks from said outer cooling zone after they have completed at least two complete revolutions therein for transfer to said non-heat resistant conveying equipment at a temperature sufficiently low to prevent damage thereto.

7. A method of continuously cooling and conveying granular material, which is supplied to cooling and conveying equipment at an initial temperature sufficiently high to damage a non-heat resistant conveying belt, which comprises depositing said material into a rotating inner cooling zone in such a manner that a plurality of layers of said material will be supported within said inner zone in tier-like arrangement, the lowermost of said plurality of layers being adapted for downward and radially outward flow in a conical-helical path across a rotating frustroconical heat-resistant surface, continuing such flow in heat-exchange relationship with a cool atmosphere for a sufficient time to produce a substantial cooling of said material, transferring said partially cooled material to an outer cooling zone rotating with said inner zone for lateral and radially outward flow of said material across a horizontal heat-resistant surface, limiting the inclination of the outer side of the deposit of material in said outer zone to within the angle of repose of said material to restrain the lateral flow of said material beyond said horizontal surface, and continuously removing said material from said outer zone for transfer to said non-heat resistant conveying belt at a temperature sufficiently low to prevent damage thereto.

8. A method of continuously cooling granular material which comprises depositing said material into a revolving bin having an angular abrasive-resistant surface adapted to support in heat-exchange relationship with a cool atmosphere a plurality of layers of said material in a tier-like arrangement, subjecting said layers in said bin to downward and outward flow in a continuous conical-helical path with respect to the vertical axis of the bin while restraining the flow beyond the extremities of said bin of all but the lowermost of said layers, transferring said lowermost layer of material from said angular surface to a horizontal abrasive-resistant surface rotating with said bin in such a manner as to effect the lateral flow of said lowermost layer across said horizontal surface and in contact with said cool atmosphere, said material being cooled as it proceeds along said downward, outward and lateral flow, and removing said material from said horizontal surface.

9. A method of continuously cooling granular material which comprises depositing said material into a revolving bin having an angular abrasive-resistant surface adapted to support in heat-exchange relationship with a cool atmosphere a plurality of layers of said material in a tier-like arrangement, applying a liquid spray to reduce the temperature of said material, subjecting said layers in said bin to downward and outward flow in a continuous conical-helical path with respect to the vertical axis of the bin while restraining the flow beyond the extremities of said bin of all but the lowermost of said layers, transferring said lowermost layer of material from said angular surface to a horizontal abrasive-resistant surface rotating with said bin in such a manner as to effect the lateral flow of said lowermost layer across said horizontal surface and in contact with said cool atmosphere, said material being cooled as it proceeds along said downward, outward, and lateral flow, and removing said material from said horizontal surface.

10. The method of claim 9 wherein the liquid spray is applied following the rotation of said bin and the material therein through substantially one complete revolution.

11. A method of continuously cooling granular material which comprises depositing said material into a revolving bin having an angular abrasive-resistant surface adapted to support in heat-exchange relationship with a cool atmosphere a plurality of layers of said material in a tier-like arrangement, applying a liquid spray to reduce the temperature of said material following the rotation of said bin and the material deposited therein through substantially one complete revolution, subjecting said layers in said bin to downward and outward flow in a continuous conical-helical path with respect to the vertical axis of the bin while restraining the flow beyond the extremities of said bin of all but the lowermost of said layers, transferring said lowermost layer of material from said angular surface to a horizontal abrasive-resistant surface rotating with said bin in such a manner as to effect the lateral flow of said lowermost layer across said horizontal surface and in contact with said cool atmosphere, said material being cooled as it proceeds along said downward, outward, and lateral flow, and continuously removing said material from said horizontal surface after said material has completed at least two complete revolutions for the further cooling thereof in heat-exchange relationship with said cool atmosphere.

12. In a method of continuously cooling shaped solid objects which are of a fragile character such that tumbling action results in substantial breakage thereof, and which are continuously supplied at a temperature sufficiently high to damage a conveyor belt upon immediate contact therewith, the steps which comprise causing a downward and radially outward but non-tumbling flow of said objects through a rotating inclined zone surrounded by a cool atmosphere, continuing such flow for a time sufficient to substantially lower the temperature of said objects, and continuously removing said objects of lower temperature to a level below the level of the said objects within said inclined zone.

FREDERICK R. GREYSON.

(References on following page)

REFERENCES CITED

The following references are of record in the file of this patent:

UNITED STATES PATENTS

| Number | Name | Date |
|---|---|---|
| 361,590 | Johnson | Apr. 19, 1887 |
| 779,106 | Wegner et al. | Jan. 3, 1905 |
| 1,673,464 | McLaughlin | June 12, 1928 |
| 1,960,522 | Alexovits | May 29, 1934 |
| 1,989,662 | Bernhard et al. | Feb. 5, 1935 |
| 2,024,934 | Lellep | Dec. 17, 1935 |
| 2,178,701 | Petre | Nov. 7, 1939 |
| 2,275,116 | Vogel-Jorgensen | Mar. 3, 1942 |
| 2,372,599 | Nachtman | Mar. 27, 1945 |